US008593444B2

(12) United States Patent
Lee et al.

(10) Patent No.: US 8,593,444 B2

(45) Date of Patent: Nov. 26, 2013

(54) METHOD OF DRIVING DISPLAY PANEL AND DISPLAY APPARATUS FOR PERFORMING THE SAME

(75) Inventors: Whee-Won Lee, Busan (KR); Seung-Hwan Moon, Asan-si (KR); Jae-Hoon Lee, Seoul (KR); Jun-Yong Song, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 292 days.

(21) Appl. No.: 13/180,749

(22) Filed: Jul. 12, 2011

(65) Prior Publication Data

US 2012/0146985 A1 Jun. 14, 2012

(30) Foreign Application Priority Data

Dec. 8, 2010 (KR) ........................ 10-2010-0124675

(51) Int. Cl.
*G06F 3/038* (2013.01)

(52) U.S. Cl.
USPC ................. 345/210; 345/95; 345/96; 345/99; 345/208; 345/209; 345/212; 345/214

(58) Field of Classification Search
USPC ................ 345/95, 96, 99, 208–210, 212, 214
See application file for complete search history.

(56) References Cited

U.S. PATENT DOCUMENTS

| | | | | |
|---|---|---|---|---|
| 6,762,565 | B2 * | 7/2004 | Kudo et al. | 315/169.2 |
| 2008/0309597 | A1 * | 12/2008 | Nam et al. | 345/87 |
| 2010/0097368 | A1 * | 4/2010 | Hwang | 345/213 |

* cited by examiner

*Primary Examiner* — Dwayne Bost
*Assistant Examiner* — Yungsang Lau
(74) *Attorney, Agent, or Firm* — Cantor Colburn LLP

(57) ABSTRACT

A method of driving a display panel includes generating a gate on voltage, generating first and second gate off voltages based on an external voltage in a first operating mode, and first and second gate off voltages based on the gate on voltage in a second operating mode, generating a clock signal based on the gate on voltage and the second gate off voltage and outputting a gate voltage generated based on the clock signal and the first and second gate off voltages to a gate line of the display panel.

20 Claims, 8 Drawing Sheets

240

METHOD OF DRIVING DISPLAY PANEL AND DISPLAY APPARATUS FOR PERFORMING THE SAME

This application claims priority to Korean Patent Application No. 2010-124675, filed on Dec. 8, 2010, and all the benefits accruing therefrom under 35 U.S.C. §119, the contents of which in its entirety is herein incorporated by reference.

BACKGROUND OF THE INVENTION

1. Field of the Invention

Exemplary embodiments of the present invention relate to a method of driving a display panel and a display apparatus for performing the method. More particularly, exemplary embodiments of the present invention relate to a method of driving a display panel while improving a display quality and a display apparatus for performing the method.

2. Description of the Related Art

Generally, a liquid crystal display ("LCD") apparatus includes a first substrate including a pixel electrode, a second substrate including a common electrode and a liquid crystal layer disposed between the first and second substrates. As voltage is applied to the pixel electrode and the common electrode an electric field is generated. By adjusting an intensity of the electric field, via a corresponding adjustment of the voltage, a transmittance of light passing through the liquid crystal layer may be adjusted in order to display a desired image.

The first substrate often includes a thin film transistor ("TFT") connected to the pixel electrode. The TFT transmits a grayscale data voltage to the pixel electrode in response to a gate signal when the LCD apparatus is turned on.

When the LCD apparatus is turned off, it is often preferable that image displayed on the LCD panel quickly disappear. However, when the LCD apparatus is turned off, the gray data voltage of the pixel electrode is often slowly discharged to a ground voltage. Thus, even though the LCD apparatus is turned off, the image on the LCD panel does not disappear quickly enough.

BRIEF SUMMARY OF THE INVENTION

Exemplary embodiments of the present invention provide a method of driving a display panel capable of quickly discharging a voltage charged in the display panel when a display apparatus is turned off.

Exemplary embodiments of the present invention also provide a display apparatus for performing the above-mentioned method.

In an exemplary embodiment, a method of driving a display panel includes generating a gate on voltage, generating first and second gate off voltages based on an external voltage in a first operating mode, or based on the gate on voltage in a second operating mode, generating a clock signal based on the gate on voltage and the second gate off voltage and outputting a gate voltage generated based on the clock signal and the first and second gate off voltages to a gate line of the display panel.

In an exemplary embodiment, the first operating mode may be performed when a display apparatus is turned on. The second operating mode may be performed when the display apparatus is turned off.

In an exemplary embodiment, the second gate off voltage may have a voltage value substantially the same as the gate on voltage in the second operating mode.

In an exemplary embodiment, the first gate off voltage may be generated based on the second gate off voltage in the second operating mode.

In an exemplary embodiment, the clock signal may alternately have voltage values of the gate on voltage and the second gate off voltage in the first operating mode.

In an exemplary embodiment, the clock signal may have a voltage value substantially the same as the gate on voltage in the second operating mode.

In an exemplary embodiment, the first and second gate off voltages may respectively have negative values, and the second gate off voltage may be smaller than the first gate off voltage in the first operating mode.

In an exemplary embodiment, a display apparatus includes a display panel, a first voltage generating part, a second voltage generating part, a signal generator and a gate driver. The display panel displays an image. The first voltage generating part generates a gate on voltage. The second voltage generating part generates first and second gate off voltages based on an external voltage in a first operating mode. Alternatively, the second voltage generating part generates first and second gate off voltages based on the gate on voltage in a second operating mode. The signal generator generates a clock signal based on the gate on voltage and the second gate off voltage. The gate driver generates a gate voltage based on the clock signal and the first and second gate off voltages. The gate driver outputs the gate voltage to a gate line of the display panel.

In an exemplary embodiment, the first operating mode may be performed when the display apparatus is turned on. The second operating mode may be performed when the display apparatus is turned off.

In an exemplary embodiment, the second voltage generating part may include a first gate off voltage generating part, a second gate off voltage generating part and a voltage sharing part. The first gate off voltage generating part may generate the first gate off voltage. The second gate off voltage generating part may generate the second gate off voltage. The voltage sharing part may output the second gate off voltage having a level of the gate on voltage in the second operating mode In an exemplary embodiment, the first gate off voltage generating part may include a first resistor, a first diode part electrically connected to the first resistor, and a first gate off voltage output terminal electrically connected to the first diode part. The second gate off voltage generating part may include a second diode part electrically connected to the first gate off voltage output terminal, a second resistor electrically connected to the second diode part, and a second gate off voltage output terminal electrically connected to the second resistor.

In an exemplary embodiment, the first gate off voltage generating part may further include a first switching element connected between the first diode part and the first gate off voltage output terminal. The first switching element may be turned off in the second operating mode In an exemplary embodiment, the first switching element may include a negative-positive-negative ("NPN") type bipolar junction transistor.

In an exemplary embodiment, the voltage sharing part may include a first capacitor and a second switching element. The first capacitor may charge the gate on voltage in the first operating mode. The second switching element may output the gate on voltage charged in the first capacitor to the second gate off voltage output terminal in the second operating mode.

In an exemplary embodiment, the display apparatus may further include a third switching element connected between the second gate off voltage output terminal and the signal generator. The third switching element may be turned off in the second operating mode.

In an exemplary embodiment, the signal generator may include a switch. The switch may include a first input terminal to which the gate on voltage is applied, a second input terminal to which the second gate off voltage is applied and an output terminal selectively connected to the first and second input terminals.

In an exemplary embodiment, the switch may be alternately connected to the first and second input terminals in the first operating mode.

In an exemplary embodiment, the switch may be connected to the first input terminal in the second operating mode.

In an exemplary embodiment, the first and second gate off voltages may respectively have negative values, and the second gate off voltage may be smaller than the first gate off voltage in the first operating mode.

In an exemplary embodiment, the gate driver may be integrated on the display panel in an amorphous silicon gate type.

According to an exemplary embodiment of a method of driving a display panel and a display apparatus for performing the method, when the display apparatus is turned off, a second gate off voltage is generated based on a gate on voltage, and a first gate off voltage is generated based on the second gate off voltage so that a thin film transistor in the display panel is turned on. Accordingly, a grayscale data voltage of a pixel electrode is quickly discharged so that an image on the display panel may quickly disappear.

BRIEF DESCRIPTION OF THE DRAWINGS

The above and other aspects, features and advantages of this disclosure will become more apparent by describing in further detail exemplary embodiments thereof with reference to the accompanying drawings, in which.

DETAILED DESCRIPTION OF THE INVENTION

Figure 1:
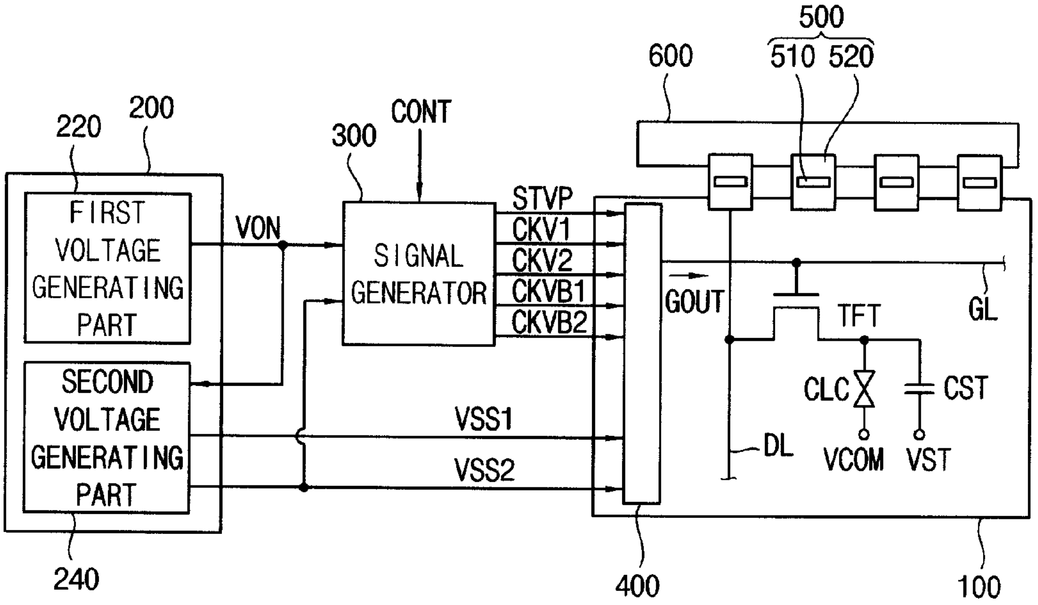
FIG. 1 is a block diagram illustrating an exemplary embodiment of a display apparatus according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

FIG. 1 is a block diagram illustrating an exemplary embodiment of a display apparatus according to the present invention.

Referring to FIG. 1, the display apparatus includes a display panel 100, a voltage generator 200, a signal generator 300, a gate driver 400, a data driver 500 and a printed circuit board 600.

The display panel 100 includes a gate line GL, a data line DL, a switching element TFT, a liquid crystal capacitor CLC and a storage capacitor CST.

The gate line GL extends in a first direction and the data line DL extends in a second direction crossing the first direction. The gate line GL may extend in a direction parallel to a longer side of the display panel 100 and the data line DL may extend in a direction parallel to a shorter side of the display panel 100.

The switching element TFT is connected to the gate line GL and the data line DL. The switching element TFT may be a thin film transistor.

To charge a grayscale data voltage, the liquid crystal capacitor CLC and the storage capacitor CST are electrically connected to the switching element TFT. The liquid crystal capacitor CLC may be defined as a pixel electrode of a first substrate and a common electrode of a second substrate facing the first substrate. The storage capacitor CST may be defined as the pixel electrode and a storage electrode. The gray scale data voltage is applied to the pixel electrode and a common voltage VCOM is applied to the common electrode. A storage voltage VST is applied to the storage electrode. The storage voltage VST may be substantially the same as the common voltage VCOM.

The voltage generator 200 includes a first voltage generating part 220 and a second voltage generating part 240.

The first voltage generating part 220 generates a gate on voltage VON. The first voltage generating part 220 outputs the gate on voltage VON to the signal generator 300. In addition, the first voltage generating part 220 outputs the gate on voltage VON to the second voltage generating part 240. The first voltage generating part 220 may include a direct current to direct current ("DC-DC") converter.

The second voltage generating part 240 generates a first gate off voltage VSS1 and a second gate off voltage VSS2. The second voltage generating part 240 outputs the first and second gate off voltages VSS1 and VSS2 to the gate driver 400. In addition, the second voltage generating part 240 outputs the second gate off voltage VSS2 to the signal generator 300. The second voltage generating part 240 may include a charge pump circuit generating a DC voltage in response to an external input voltage. The input voltage may be a pulse width modulation ("PWM") signal.

When the display apparatus is turned on, the second voltage generating part 240 generates the first and second gate off voltages VSS1 and VSS2 based on the input voltage. When the display apparatus is turned off, the second voltage generating part 240 generates the first and second gate off voltages VSS1 and VSS2 based on the gate on voltage VON. When the display apparatus is turned off, a level of the second gate off voltage VSS2 may be substantially the same as a level of the gate on voltage VON.

Figure 2:
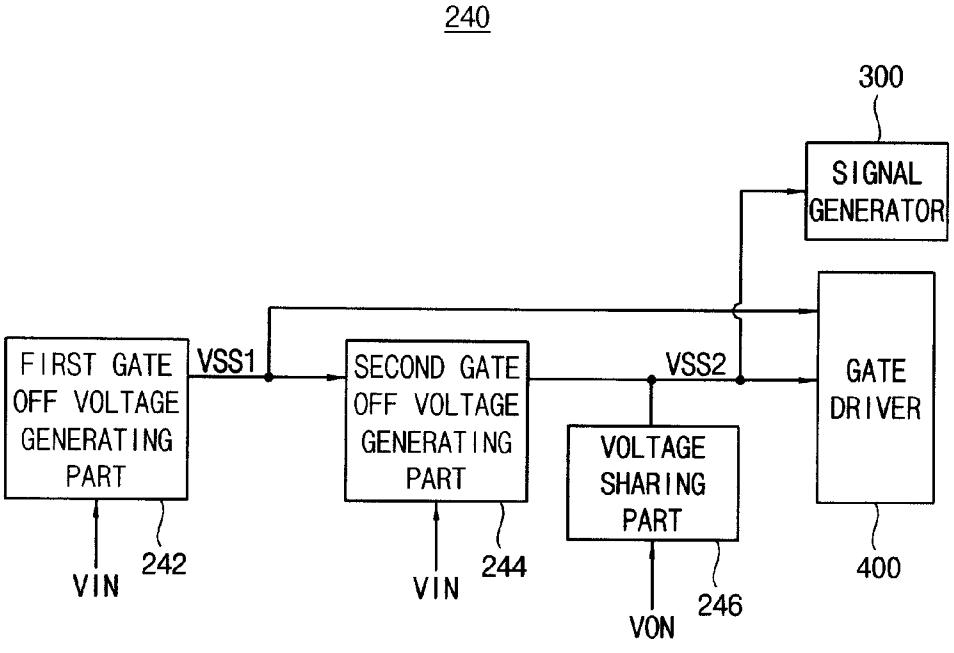
FIG. 2 is a block diagram illustrating an exemplary embodiment of a second voltage generating part of FIG. 1.
Figure 3:
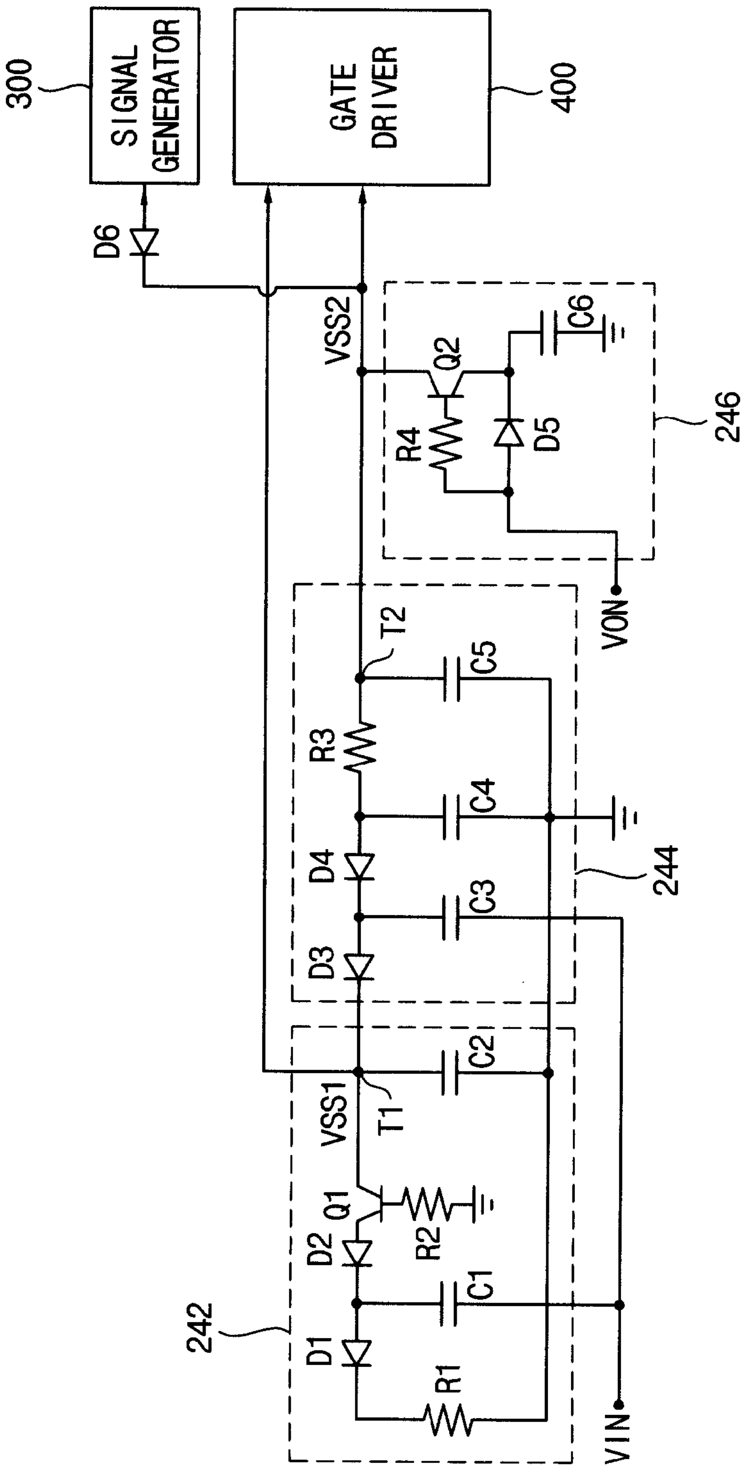
FIG. 3 is a circuit diagram illustrating an exemplary embodiment of the second voltage generating part of FIG. 1.

The second voltage generating part 240 is explained in detail referring to FIGS. 2 and 3.

The gate on voltage VON has a value for turning on the switching element TFT of the display panel 100. The first and second gate off voltages VSS1 and VSS2 have values for turning off the switching element TFT of the display panel 100. The second gate off voltage VSS2 is used during a first period from a turn-off moment of the switching element TFT. The first gate off voltage VSS1 is used after the first period from the turn-off moment of the switching element TFT to maintain the switching element TFT turned off. The first period may be very short. A response delay of the switching element TFT is compensated using the second gate off voltage VSS2 so that the switching element TFT may be turned off at a desired moment.

In an exemplary embodiment, the gate on voltage VON may have a positive (+) value. The first and second gate off voltages VSS1 and VSS2 may have negative (−) values. The second gate off voltage VSS2 may be smaller than the first gate off voltage VSS1.

In an exemplary embodiment, the gate on voltage VON may be from about 15 volts (V) to about 30V. The first gate off voltage VSS1 may be from about −5.5V to about −6.0V. The second gate off voltage VSS2 may be from about −9.5V to about −10.0V. A difference between the first and second gate off voltages VSS1 and VSS2 may be from about −3.5V to about −4.0V. Preferably, when driving the display panel 100, the difference between the first and second gate off voltages VSS1 and VSS2 may be uniformly maintained. The gate on voltage VON may be about 20V. The first gate off voltage VSS1 may be about −5.6V and the second gate off voltage VSS2 may be about −9.6V.

The signal generator 300 receives the gate on voltage VON from the first voltage generating part 220 and the second gate off voltage VSS2 from the second voltage generating part 240. The signal generator 300 receives a control signal CONT from a timing controller. The signal generator 300 generates a vertical start signal STVP and a clock signal based on the gate on voltage VON, the second gate off voltage VSS2 and the control signal CONT. The signal generator 300 outputs the vertical start signal STVP and the clock signal to the gate driver 400.

The signal generator 300 may include a switch. The switch may include a first input terminal to which the gate on voltage VON is applied, a second input terminal to which the second gate off voltage VSS2 is applied and an output terminal selectively connected to the first and second input terminals.

An operation of the switch is subsequently explained in detail referring to FIG. 4.

The clock signal may include a first clock signal CKV1, a second clock signal CKV2, a first inverted clock signal CKVB1 and a second inverted clock signal CKVB2. The second clock signal CKV2 may be delayed in a half of a horizontal cycle with respect to the first clock signal CKV1. The first inverted clock signal CKVB1 may be inverted with respect to the first clock signal CKV1. The second inverted clock signal CKVB2 may be inverted with respect to the second clock signal CKV2.

In an exemplary embodiment, the first clock signal CKV1 and the first inverted clock signal CKVB1 may be used to generate gate voltages GOUT applied to odd-numbered gate lines GL of the display panel 100. The second clock signal CKV2 and the second inverted clock signal CKVB2 may be used to generate gate voltages GOUT applied to even-numbered gate lines GL of the display panel 100. The first clock signal CKV1 may be used to generate gate voltages GOUT applied to (4N−3)-th gate lines GL. Herein, N is a natural number. The first inverted clock signal CKVB1 may be used to generate gate voltages GOUT applied to (4N−1)-th gate lines GL. The second clock signal CKV2 may be used to generate gate voltages GOUT applied to (4N−2)-th gate lines GL. The second inverted clock signal CKVB2 may be used to generate gate voltages GOUT applied to (4N)-th gate lines GL.

The clock signal may include only the first clock signal CKV1 and the first inverted clock signal CKVB1. In this case, the first clock signal CKV1 may be used to generate the gate voltages GOUT applied to the odd-numbered gate lines GL of the display panel 100 and the first inverted clock signal CKVB1 may be used to generate the gate voltages GOUT applied to the even-numbered gate lines of the display panel 100.

The gate driver 400 receives the vertical start signal STVP and the clock signals CKV1, CKV2, CKVB1 and CKVB2 from the signal generator 300. The gate driver 400 receives the first and second gate off voltages VSS1 and VSS2 from the second voltage generating part 240.

The gate driver 400 generates the gate voltage GOUT based on the clock signals CKV1, CKV2, CKVB1 and CKVB2 and the first and second gate off voltages VSS1 and VSS2 and outputs the gate voltage GOUT to the gate line GL of the display panel 100.

The gate driver 400 may include a plurality of driving switching elements applying the clock signals CKV1, CKV2, CKVB1 and CKVB2 and the first gate off voltage VSS1 to the gate line GL. In an exemplary embodiment, the gate driver 400 may include first and second driving switching elements of which drain electrodes are connected to each other. The clock signals CKV1, CKV2, CKVB1 and CKVB2 may be applied to a source electrode of the first driving switching element and the first gate off voltage VSS1 may be applied to a source electrode of the second driving switching element.

The gate voltage GOUT may be a pulse signal. A high level of the gate voltage GOUT is generated using the clock signals CKV1, CKV2, CKVB1 and CKVB2 and may be substantially the same as the gate on voltage VON. A low level of the gate voltage GOUT is generated using the clock signals CKV1, CKV2, CKVB1 and CKVB2 and the first gate off voltage VSS1. The low level of the gate voltage GOUT may be substantially the same as the second gate off voltage VSS2 at a falling edge of the gate voltage GOUT and may be substantially the same as the first gate off voltage VSS1 after a specific period from the falling edge.

The gate driver 400 may be directly integrated on the display panel 100 in an amorphous silicon gate ("ASG") type.

The data driver 500 includes a data driving chip 510 and a flexible printed circuit board 520. The data driving chip 510 generates the grayscale data voltage and outputs the grayscale data voltage to the data line DL of the display panel 100. A first end portion of the flexible printed circuit board 520 is connected to the display panel 100 and a second end portion of the flexible printed circuit board 520 opposite to the first end portion is connected to the printed circuit board 600. The flexible printed circuit board 520 electrically connects the display panel 100 and the printed circuit board 600.

In the present exemplary embodiment, even though the data driving chip 510 is mounted on the flexible printed circuit board 520, the data driving chip 510 may be mounted on the display panel 100 or may be integrated into the display panel 100.

The data driver 500 receives grayscale data and a data control signal from the timing controller. In an exemplary embodiment, the data control signal may include a horizontal start signal, a load signal, an inverting signal and a data clock signal. The data driver 500 converts the grayscale data to the grayscale data voltage having an analogue type using a gamma reference voltage and outputs the grayscale data voltage to the data line DL.

FIG. 2 is a block diagram illustrating an exemplary embodiment of the second voltage generating part 240 of FIG. 1.

Referring to FIG. 2, the second voltage generating part 240 includes a first gate off voltage generating part 242, a second gate off voltage generating part 244 and a voltage sharing part 246. The second voltage generating part 240 receives the input voltage VIN from outside. The second voltage generating part 240 receives the gate on voltage VON from the first voltage generating part 220.

The second voltage generating part 240 may include a charge pump circuit. The input voltage VIN may be a PWM signal.

When the display apparatus is turned on, the first gate off voltage generating part 242 generates the first gate off voltage VSS1 using the input voltage VIN. When the display apparatus is turned off, the first gate off voltage generating part 242 generates the first gate off voltage VSS1 using the second gate off voltage VSS2. The first gate off voltage generating part 242 outputs the first gate off voltage VSS1 to the second gate off voltage generating part 244 and the gate driver 400.

The second gate off voltage generator 244 is electrically connected to the first gate off voltage generating part 242. When the display apparatus is turned on, the second gate off voltage generator 244 generates the second gate off voltage VSS2 using the input voltage VIN. When the display apparatus is turned off, the second gate off voltage generator 244 generates the second gate off voltage VSS2 using the gate on voltage VON. The second gate off voltage generator 244 outputs the second gate off voltage VSS2 to the signal generator 300 and the gate driver 400.

The voltage sharing part 246 is electrically connected to an output terminal of the second gate off voltage generator 244. When the display apparatus is turned on, the voltage sharing part 246 does not substantially influence to an operation of the second gate off voltage generator 244. When the display apparatus is turned off, the voltage sharing part 246 shares the gate on voltage VON with the second gate off voltage generator 244 generating the second gate off voltage VSS2 so that the second gate off voltage VSS2 has a voltage level of the gate on voltage VON.

FIG. 3 is a circuit diagram illustrating an exemplary embodiment of the second voltage generating part 240 of FIG. 1.

Referring to FIGS. 2 and 3, the first gate off voltage generating part 242 includes a first resistor R1, a first diode part and a first gate off voltage output terminal T1. The first diode part includes a first diode D1 and a second diode D2. The first gate off voltage generating part 242 includes a first switching element Q1 disposed between the second diode D2 and the first gate off voltage output terminal T1. The first gate off voltage generating part 242 may further include a first capacitor and a second capacitor.

An anode, which is a positive (+) electrode, of the first diode D1 is connected to a first terminal of the first capacitor C1 and a cathode, which is a negative (−) electrode, of the first diode D1 is connected to a first end of the first resistor R1. A second end of the first resistor R1 is connected to a ground. The input voltage VIN is applied to a second terminal of the first capacitor C1. An anode of the second diode D2 is connected to an emitter of the first switching element Q1 and a cathode of the second diode D2 is connected to the anode of the first diode D1. A collector of the first switching element Q1 is connected to a first terminal of the second capacitor C2 and a base of the first switching element Q1 is connected to a first end of the second resistor R2. A second end of the second resistor R2 is connected to the ground. A second terminal of the second capacitor C2 is connected to the ground. A node at which the collector of the first switching element Q1 and the first terminal of the second capacitor C2 are connected to each other is defined as the first gate off voltage output terminal T1.

The first switching element Q1 may be a negative-positive-negative ("NPN") type bipolar junction transistor ("BJT").

The second gate off voltage generating part 244 includes a second diode part, a third resistor R3 and a second gate off voltage output terminal T2. The second diode part includes a third diode D3 and a fourth diode D4. The second gate off voltage generating part 244 may further include a third capacitor C3, a fourth capacitor C4 and a fifth capacitor C5.

An anode of the third diode D3 is connected to a first terminal of the third capacitor C3 and a cathode of the third diode D3 is connected to the first gate off output terminal T1 of the first gate off voltage generating part 242. The input voltage VIN is applied to a second terminal of the third capacitor C3. An anode of the fourth diode D4 is connected to a first terminal of the fourth capacitor C4 and a cathode of the fourth diode D4 is connected to the anode of the third capacitor C3. A second terminal of the fourth capacitor C4 is connected to the ground. A first end of the third resistor R3 is connected to the anode of the fourth diode D4 and a second end of the third resistor R3 is connected to a first terminal of the fifth capacitor C5. A second terminal of the fifth capacitor C5 is connected to the ground. A node at which the second end of the third resistor R3 and the first terminal of the fifth capacitor C5 are connected to each other is defined as the second gate off voltage output terminal T2.

The third resistor R3 is a drop resistor to drop an absolute value of a voltage generated at the anode of the fourth diode D4. By adjusting the third resistor R3, the level of the second gate off voltage VSS2 may be adjusted properly. The fifth capacitor stabilizes the level of the second gate off voltage VSS2.

The voltage sharing part 246 includes a second switching element Q2, a fifth diode D5, a fourth resistor R4 and a sixth capacitor C6. The second switching element Q2 may be a positive-negative-positive ("PNP") type BJT.

An emitter of the second switching element Q2 is connected to an anode of the fifth diode D5. A base of the second switching element Q2 is connected to a first end of the fourth resistor R4. A collector of the second switching element Q2 is connected to the second gate off voltage output terminal T2. The gate on voltage VON is applied to a cathode of the fifth diode D5 and a second end of the fourth resistor R4. A first terminal of the sixth capacitor C6 is connected to the emitter of the second switching element Q2 and a second terminal of the sixth capacitor C6 is connected to the ground.

The display apparatus may further include a third switching element D6 connected between the second gate off voltage generator T2 and the signal generator 300. The third switching element D6 may include a diode. When the display apparatus is turned on, the third switching element D6 does not substantially influence to the other elements of the display apparatus. When the display apparatus is turned off, the third switching element D6 is turned off. By the third switching element D6, the second gate off voltage VSS2 is not applied to the signal generator 300 or other elements so that the second gate off voltage VSS2 may be fully applied to the gate driver 400.

Hereinafter, an operation of the second voltage generating part 240 is explained in detail.

When the display apparatus is turned on, the first gate off voltage generating part 242 generates the first gate off voltage VSS1 using the input voltage VIN and the second gate off voltage generating part 244 generates the second gate off voltage VSS2 using the input voltage VIN. The voltage sharing part 246 does not substantially influence to the operation of the second voltage generating part 240.

When the display apparatus is turned on, the gate on voltage VON has a relatively high positive value so that the second switching element Q2 is turned off. Accordingly, the voltage sharing part 246 is disconnected from the second gate off voltage output terminal T2, so that the gate on voltage VON is charged in the sixth capacitor C6 through the fifth diode D5. Since the second switching element Q2 is turned off, the second gate off voltage VSS2 is generated based on the input voltage VIN. In addition, the first gate off voltage VSS1 is generated based on the input voltage VIN.

When the display apparatus is turned off, the gate on voltage VON is decreased so that the second switching element Q2 is turned on and the gate on voltage VON charged in the sixth capacitor C6 is outputted to the second gate off voltage output terminal T2. The voltage sharing part 246 shares the gate on voltage VON with the second gate off voltage VSS2 so that the second gate off voltage VSS2 has a level of the gate on voltage VON. The second gate off voltage VSS2 is outputted to the gate driver 400.

When the display apparatus is turned off, the gate on voltage VON is gradually converged from the high positive value to the ground so that the second gate off voltage VSS2 may have a positive value for a second.

The second gate off voltage VSS2 is applied to the first gate off voltage output terminal T1 through the third resistor R3, the fourth diode D4 and the third diode D3. The first gate off voltage VSS1 is generated based on the second gate off voltage VSS2. The first gate off voltage VSS1 is outputted to the gate driver 400.

At this time, the first switching element Q1 is turned off so that the first gate off voltage output terminal T1 is disconnected from the second diode D2. Accordingly, the first gate off voltage VSS1 is effectively prevented from decreasing.

The second gate off voltage VSS2 may be dropped in a specific value when passing through the fourth diode D4 and third diode D3. In an exemplary embodiment, the second gate off voltage VSS2 may be respectively dropped about 0.7V by the fourth diode D4 and third diode D3. Thus, the first gate off voltage VSS1 may be about 1.4V smaller than the second gate off voltage VSS2.

When the display apparatus is turned off, the second gate off voltage VSS2 is shared with the gate on voltage VON having the positive value, so that the first gate off voltage VSS1 may have a positive value for a second.

Therefore, when the display apparatus is turned off, the first and second gate off voltages VSS1 and VSS2 are generated based on the gate on voltage VON, so that the first and second gate off voltages VSS1 and VSS2 are boosted comparing to the first and second gate off voltages VSS1 and VSS2 when the display apparatus is turned on.

In addition, when the display apparatus is turned off, the third switching element D6 is turned off, so that the second gate off voltage VSS2 is not applied to the signal generator 300 or other elements. Accordingly, the second gate off voltage VSS2 is effectively prevented from decreasing.

Figure 4:
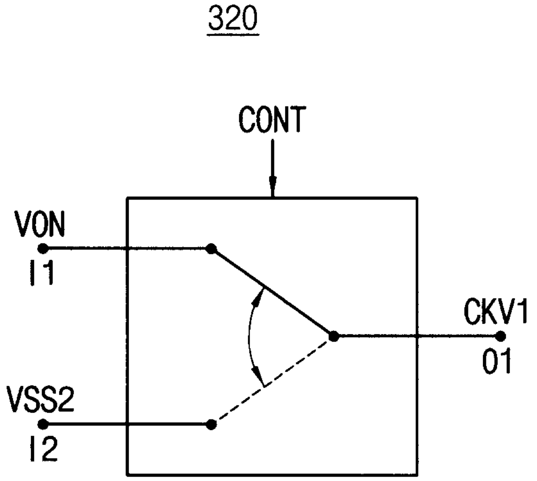
FIG. 4 is a conceptual diagram illustrating an exemplary embodiment of an operation of a switch of a signal generator of FIG. 1.

FIG. 4 is a conceptual diagram illustrating an exemplary embodiment of an operation of a switch 320 of the signal generator 300 of FIG. 1.

Referring to FIGS. 1 and 4, the signal generator 300 includes the switch 320. The switch 320 includes a first input terminal I1, a second input terminal I2 and an output terminal O1. The gate on voltage VON is applied to the first input terminal I1. The second gate off voltage VSS2 is applied to the second input terminal I2. The output terminal O1 is selectively connected to the first and second input terminals I1 and I2 in response to the control signal CONT so that the output terminal O1 outputs the first clock signal CKV1.

When the display apparatus is turned on, the output terminal O1 is alternately connected to the first and second input terminals I1 and I2 so that the switch 320 generates the first clock signal CKV1 alternately having the gate on voltage VON and the second gate off voltage VSS2.

When the display apparatus is turned off, an operation of the switch 320 stops so that the first clock signal CKV1 is gradually converged to the ground.

In the present exemplary embodiment, even though the switch 320 generates the first clock signal CKV1, the switch 320 may generate the second clock signal CKV2, the first inverted clock signal CKVB1 and the second inverted clock signal CKVB2 in a similar manner.

Figure 5:
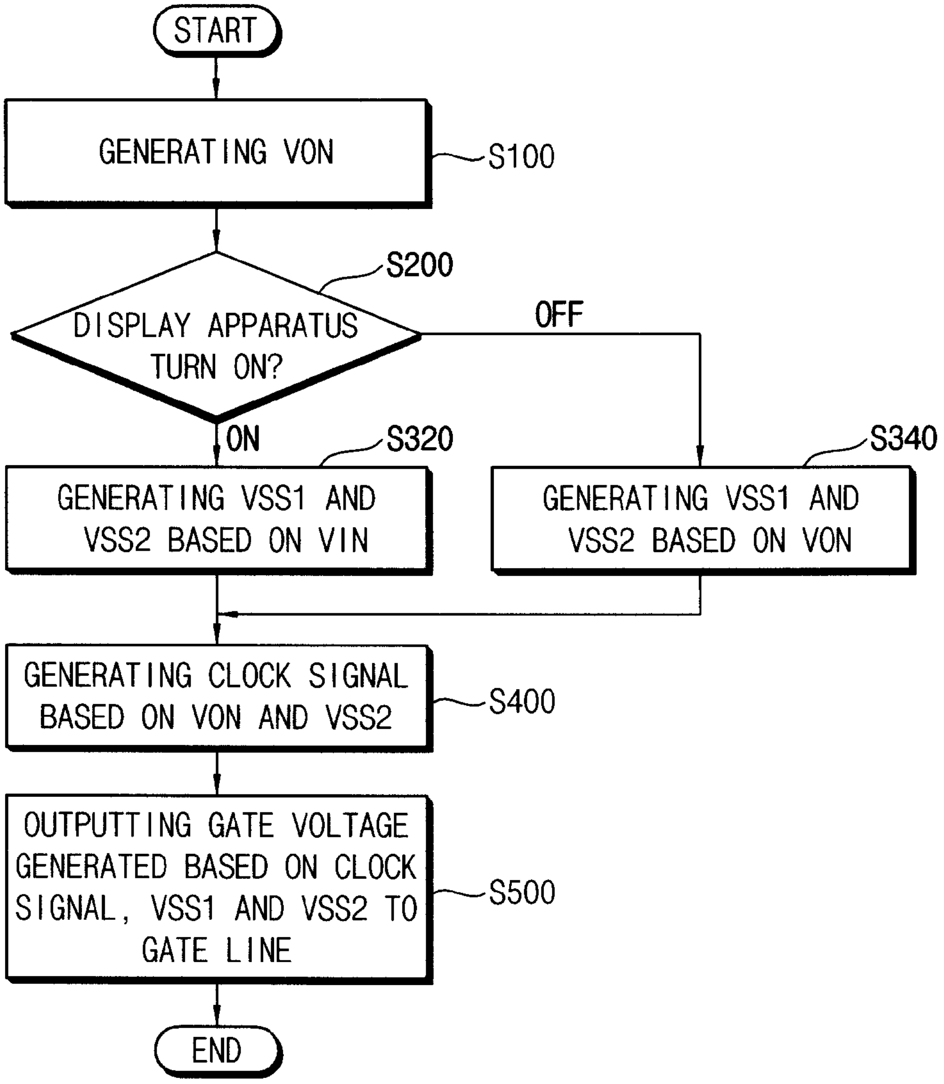
FIG. 5 is a flowchart illustrating an exemplary embodiment of a method of driving a display panel of FIG. 1.

FIG. 5 is a flowchart illustrating an exemplary embodiment of a method of driving the display panel 100 of FIG. 1.

Referring to FIGS. 1 to 5, the first voltage generating part 220 generates the gate on voltage VON (step S100).

The second voltage generating part 240 operates differently depending on and according to whether the display apparatus is turned on or off (step S200).

When the display apparatus is turned on, the second voltage generating part 240 generates the first and second gate off voltages VSS1 and VSS2 based on the input voltage VIN (step S320).

When the display apparatus is turned off, the second voltage generating part 240 generates the first and second gate off voltages VSS1 and VSS2 based on the gate on voltage VON (step S340).

In detail, when the display apparatus is turned off, the second voltage generating part 240 generates the second gate off voltage VSS2 based on the gate on voltage VON and the first gate off voltage VSS1 based on the second gate off voltage VSS2.

The signal generator 300 generates the clock signals CKV1, CKV2, CKVB1 and CKVB2 based on the gate on voltage VON and the second gate off voltage VSS2 (step S400).

The gate driver 400 generates the gate voltage GOUT based on the clock signals CKV1, CKV2, CKVB1 and CKVB2 and the first and second gate off voltages VSS1 and VSS2. Then, the gate driver 400 outputs the gate voltage GOUT to the gate line GL of the display panel 100 (step S500).

Figure 6A:
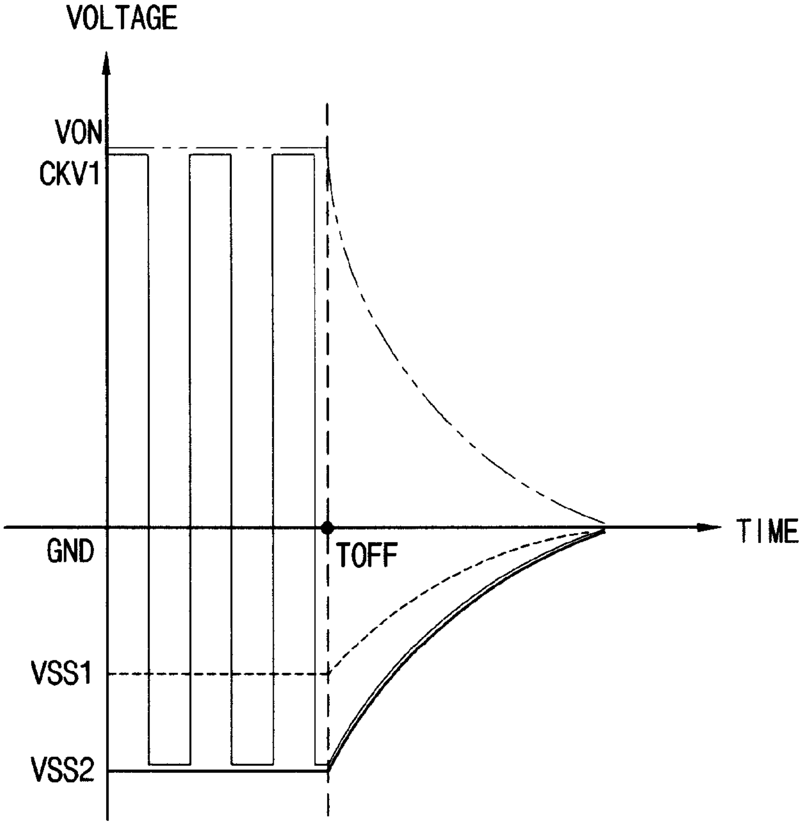
FIG. 6A is waveform diagram illustrating driving signals of a display panel not including a voltage sharing part.
Figure 6B:
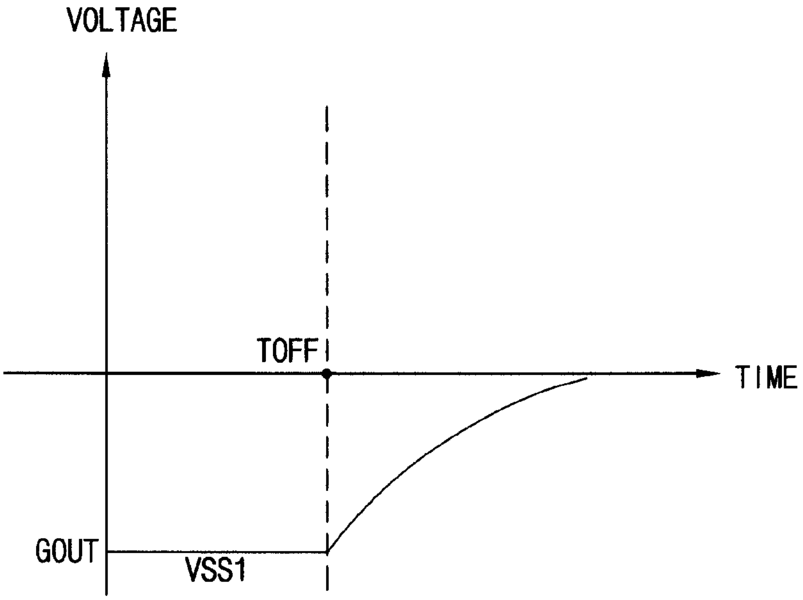
FIG. 6B is waveform diagram illustrating a gate voltage of the display panel not including the voltage sharing part.

FIG. 6A is waveform diagram illustrating driving signals VON, VSS1, VSS2 and CKV1 of a display panel not including a voltage sharing part 246. FIG. 6B is waveform diagram illustrating the gate voltage GOUT of the display panel not including the voltage sharing part 246.

Referring to FIGS. 6A and 6B, when the display apparatus is turned on, the gate on voltage VON has a positive value and the first and second gate off voltages VSS1 and VSS2, respectively, have negative values. The second gate off voltage VSS2 is smaller than the first gate off voltage VSS1. The gate on voltage VON and the first and second gate off voltages VSS1 and VSS2 are respectively DC voltages having uniform levels.

The first clock signal CKV1 increases and decreases between the gate on voltage VON and the second gate off voltage VSS2 in a predetermined cycle.

The display apparatus is turned off at a turn-off moment TOFF.

When the display apparatus is turned off, current flows to the display apparatus stop and all of the voltages applied to the display apparatus are gradually converged to a ground level GND. In an exemplary embodiment, the gate on voltage VON and the first and second gate off voltages VSS1 and VSS2 are converged from the uniform levels to the ground level GND. In addition, the first clock signal CKV1 swinging in the predetermined cycle is converged to the ground level GND.

The gate voltage GOUT is generated based on the gate on voltage VON and the first and second gate off voltages VSS1 and VSS2. The gate voltage GOUT is outputted to the gate line GL of the display panel 100.

When the display apparatus is turned on, the gate voltage GOUT has a level of the gate on voltage VON for a horizontal cycle, a level of the second gate off voltage VSS2 for a relatively short time after having the gate on voltage VON and a level of the first gate off voltage VSS1 for a relatively long time after having the second gate off voltage VSS2. Thus, it is assumed that the display apparatus is turned off when the gate voltage GOUT has the level of the first gate off voltage VSS1.

When the display apparatus is turned off, the gate voltage GOUT is gradually converged from the first gate off voltage VSS1 to the ground level GND, so that turn-on of the switching element TFT of the display panel 100 may be not guaranteed. Thus, the grayscale data voltage charged to the pixel electrode of the display panel 100 may be not quickly discharged.

Figure 7A:
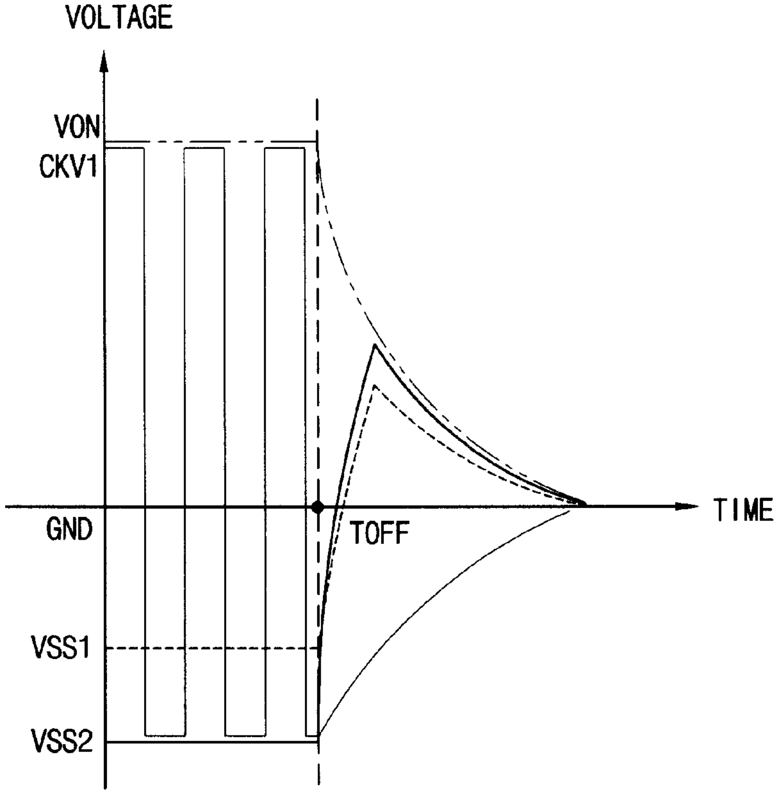
FIG. 7A is waveform diagram illustrating an exemplary embodiment of driving signals of a display panel of FIG. 1.
Figure 7B:
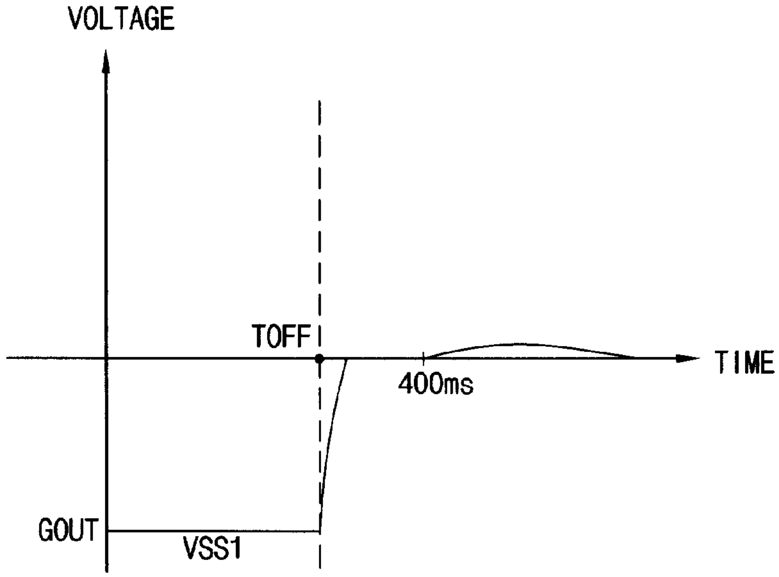
FIG. 7B is waveform diagram illustrating an exemplary embodiment of a gate voltage of the display panel of FIG. 1.

FIG. 7A is waveform diagram illustrating an exemplary embodiment of driving signals VON, VSS1, VSS2 and CKV1 of the display panel 100 of FIG. 1. FIG. 7B is waveform diagram illustrating an exemplary embodiment the gate voltage GOUT of the display panel 100 of FIG. 1.

Referring to FIGS. 1 to 5, 7A and 7B, when the display apparatus is turned on, the voltage sharing part 246 of the second voltage generating part 240 is not operated.

Thus, when the display apparatus is turned on, the waveforms of the driving signals VON, VSS1, VSS2 and CKV1 and the gate voltage GOUT may be substantially the same as the waveforms in FIGS. 6A and 6B.

When the display apparatus is turned off at a turn-off moment TOFF, current flows to the display apparatus stop and the gate on voltage VON is gradually converged to the ground level GND.

When the display apparatus is turned off, the second switching element Q2 is turned on so that the gate on voltage VON charged in the sixth capacitor C6 is applied to the second gate off voltage output terminal T2. Accordingly, the second gate off voltage VSS2 is boosted to be substantially the same as the gate on voltage VON.

In addition, the second gate off voltage VSS2 is applied to the first gate off voltage output terminal T1 through the third resistor R3, the fourth diode D4 and the third diode D3, so that the first gate off voltage VSS1 is boosted to approach the second gate off voltage VSS2.

At this time, the first switching element Q1 is turned off, so that first gate off voltage output terminal T1 is disconnected from the second diode D2. Accordingly, the first gate off voltage VSS1 is effectively prevented from decreasing.

The first clock signal CKV1 swinging in the predetermined cycle may be converged from a level of the second gate off voltage VSS2 to the ground level GND.

The gate voltage GOUT is influenced by the boosted first and second gate off voltages VSS1 and VSS2.

The gate voltage GOUT according to the present exemplary embodiment explained referring to FIGS. 1 to 5 is more quickly converged from the first gate off voltage VSS1 to the ground level GND comparing to the gate voltage GOUT in FIG. 6B. In addition, the gate voltage GOUT may increase over the ground level GND at about 400 milliseconds (ms) so that the display panel may be quickly discharged.

According to the present exemplary embodiment explained referring to FIGS. 1 to 5, when the display apparatus is turned off, the first and second gate off voltages VSS1 and VSS2 are quickly boosted a level greater than the ground level GND based on the gate on voltage VON. By the gate voltage generated based on the first and second gate off voltages VSS1 and VSS2 and the clock signals CKV1, CKV2, CKVB1 and CKVB2, the switching element TFT of the display panel 100 is easily turned on, so that the grayscale data voltage charged to the pixel electrode of the display panel 100 may be quickly discharged through the data line DL. Thus, when the display apparatus is turned off, an image on the display panel 100 may quickly disappear.

Figure 8:
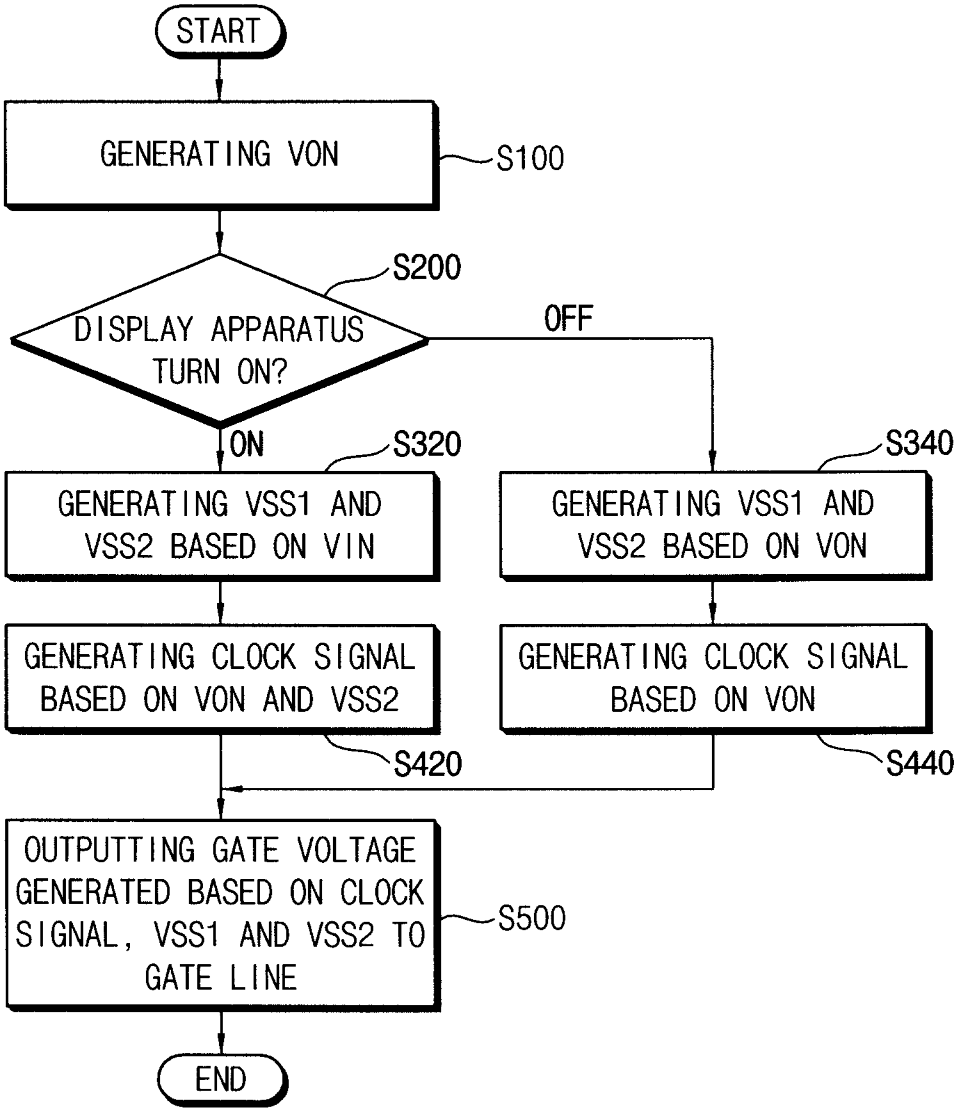
FIG. 8 is a flowchart illustrating another exemplary embodiment of a method of driving a display panel according to the present invention.

FIG. 8 is a flowchart illustrating another exemplary embodiment of a method of driving a display panel 100 according to the present invention.

The display apparatus according to the present exemplary embodiment is substantially the same as the display apparatus according to the previous exemplary embodiment explained in reference to FIGS. 1 to 4. Thus, the same reference numerals will be used to refer to the same or like parts as those described in the previous exemplary embodiment of FIGS. 1 to 4 and any repetitive explanation concerning the above elements will be omitted.

The method of driving the display panel 100 according to the present exemplary embodiment is substantially the same as the method of driving the display panel 100 according to the previous exemplary embodiment explained in reference to FIG. 5 except for generating the clock signal (step S400). Thus, the same reference numerals will be used to refer to the same or like parts as those described in the previous exemplary embodiment of FIG. 5 and any repetitive explanation concerning the above elements will be omitted.

Referring to FIGS. 1 to 4 and 8, the first the first voltage generating part 220 generates the gate on voltage VON (step S100).

The second voltage generating part 240 operates differently depending on and according to whether the display apparatus is turned on or off (step S200).

When the display apparatus is turned on, the second voltage generating part 240 generates the first and second gate off voltages VSS1 and VSS2 based on the input voltage VIN (step S320).

When the display apparatus is turned off, the second voltage generating part 240 generates the first and second gate off voltages VSS1 and VSS2 based on the gate on voltage VON (step S340).

In detail, when the display apparatus is turned off, the second voltage generating part 240 generates the second gate off voltage VSS2 based on the gate on voltage VON and the first gate off voltage VSS1 based on the second gate off voltage VSS2.

When the display apparatus is turned on, the signal generator 300 generates the clock signals CKV1, CKV2, CKVB1 and CKVB2 based on the gate on voltage VON and the second gate off voltage VSS2 (step S420).

When the display apparatus is turned off, the signal generator 300 generates the clock signals CKV1, CKV2, CKVB1 and CKVB2 based on the gate on voltage VON (step S440).

Referring to FIG. 4 again, when the display apparatus is turned on, the output terminal O1 is alternately connected to the first and second input terminals I1 and I2 so that the switch 320 generates the first clock signal CKV1 alternately having the gate on voltage VON and the second gate off voltage VSS2.

In the present exemplary embodiment explained in FIG. 8, when the display apparatus is turned off, the switch 320 is controlled in order to be connected to the first input terminal I1 so that the switch 320 generates the first clock signal CKV1 having the DC voltage of the gate on voltage VON.

In the present exemplary embodiment, even though the switch 320 generates the first clock signal CKV1, the switch 320 may generate the second clock signal CKV2, the first inverted clock signal CKVB1 and the second inverted clock signal CKVB2 in a similar manner.

The gate driver 400 generates the gate voltage GOUT based on the clock signals CKV1, CKV2, CKVB1 and CKVB2 and the first and second gate off voltages VSS1 and VSS2. Then, the gate driver 400 outputs the gate voltage GOUT to the gate line GL of the display panel 100 (step S500).

Figure 9A:
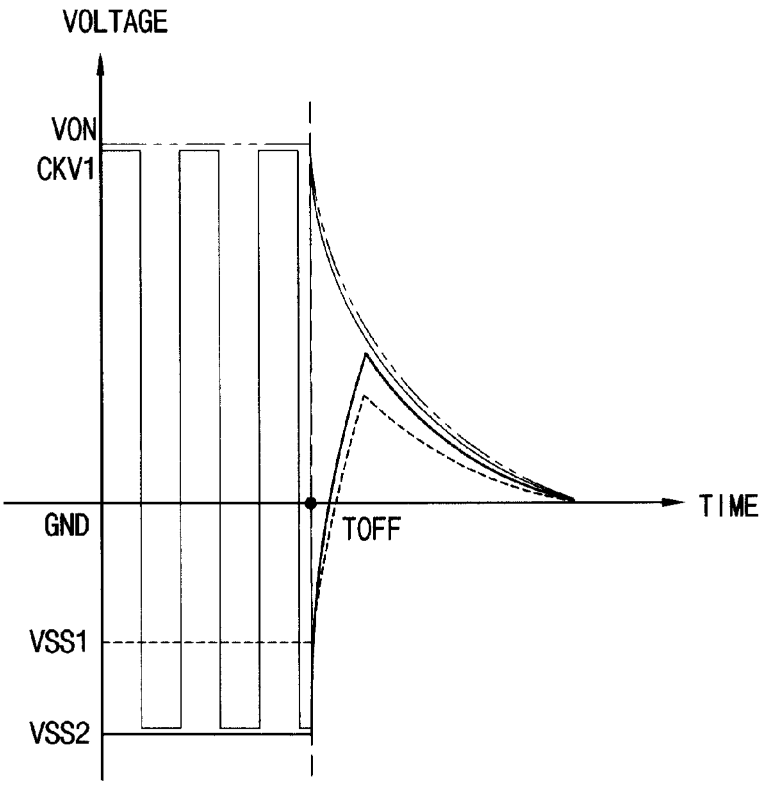
FIG. 9A is waveform diagram illustrating an exemplary embodiment of driving signals of the display panel driven by the method of FIG. 8.
Figure 9B:
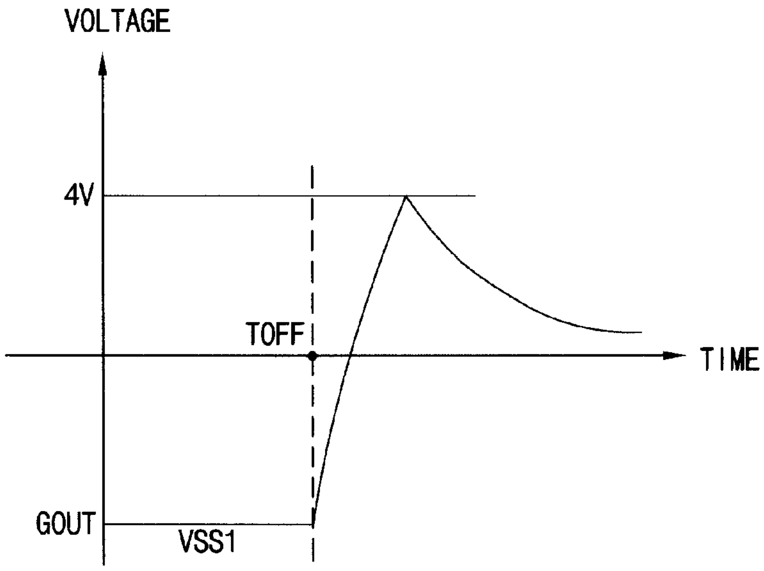
FIG. 9B is waveform diagram illustrating an exemplary embodiment of a gate voltage of the display panel driven by the method of FIG. 8.

FIG. 9A is waveform diagram illustrating an exemplary embodiment of the driving signals VON, VSS1, VSS2 and CKV1 of the display panel 100 driven by the method of FIG. 8. FIG. 9B is waveform diagram illustrating an exemplary embodiment of the gate voltage GOUT of the display panel 100 driven by the method of FIG. 8.

Referring to FIGS. 1 to 4, 8, 9A and 9B, when the display apparatus is turned on, the voltage sharing part 246 of the second voltage generating part 240 is not operated.

Thus, when the display apparatus is turned on, the waveforms of the driving signals VON, VSS1, VSS2 and CKV1 and the gate voltage GOUT may be substantially the same as the waveforms in FIGS. 6A and 6B.

When the display apparatus is turned off at a turn-off moment TOFF, current flows to the display apparatus stop and the gate on voltage VON is gradually converged to the ground level GND.

When the display apparatus is turned off, the second switching element Q2 is turned on so that the gate on voltage VON charged in the sixth capacitor C6 is applied to the second gate off voltage output terminal T2. Accordingly, the second gate off voltage VSS2 is boosted to be substantially the same as the gate on voltage VON.

In addition, the second gate off voltage VSS2 is applied to the first gate off voltage output terminal T1 through the third resistor R3, the fourth diode D4 and the third diode D3 so that the first gate off voltage VSS1 is boosted to approach the second gate off voltage VSS2.

At this time, the first switching element Q1 is turned off so that first gate off voltage output terminal T1 is disconnected from the second diode D2. Accordingly, the first gate off voltage VSS1 is effectively prevented from decreasing.

When the display apparatus is turned off, the switch 320 is controlled the output terminal O1 to be connected to the first input terminal I1 so that the clock signal CKV1 is boosted to the gate on voltage VON. In an exemplary embodiment, at the turn-off moment TOFF, the first clock signal CKV1 may be boosted from the second gate off voltage VSS2 to the gate on voltage VON in a moment. In an exemplary embodiment, the second clock signal CKV2, the first inverted clock signal CKVB1 and the second inverted clock signal CKVB2 may be boosted to the gate on voltage VON at the turn-off moment TOFF.

The gate voltage GOUT is influenced by the boosted first and second gate off voltages VSS1 and VSS2 and the boosted clock signals CKV1, CKV2, CKVB1 and CKVB2.

The gate voltage GOUT, according to the present exemplary embodiment explained referring to FIG. 8, is more quickly boosted from the first gate off voltage VSS1 to the level greater than the ground level GND comparing to the gate voltage GOUT in FIG. 6B. In an exemplary embodiment, the gate voltage VOUT may be boosted to about 4V. In addition, the gate voltage VOUT has the level greater than the ground level GND for several seconds so that the display panel may be quickly discharged.

According to the present exemplary embodiment explained referring to FIG. 8, when the display apparatus is turned off, the first and second gate off voltages VSS1 and VSS2 are quickly boosted to a level greater than the ground level GND based on the gate on voltage VON and the clock signals CKV1, CKV2, CKVB1 and CKVB2 are boosted to the level of the gate on voltage VON. By the gate voltage, generated based on the first and second gate off voltages VSS1 and VSS2 and the clock signals CKV1, CKV2, CKVB1 and CKVB2, the switching element TFT of the display panel 100 is easily turned on, so that the grayscale data voltage charged to the pixel electrode of the display panel 100 may be quickly discharged through the data line DL. Thus, when the display apparatus is turned off, an image on the display panel 100 may disappear quicker.

As explained above, the first and second gate off voltages VSS1 and VSS2 and the clock signals CKV1, CKV2, CKVB1 and CKVB2 are adjusted so that an image on the display panel may quickly disappear when the display apparatus is turned off.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of driving a display panel, the method comprising:

generating a gate on voltage;

generating first and second gate off voltages based on an external voltage in a first operating mode, or based on the gate on voltage in a second operating mode;

generating a clock signal based on the gate on voltage and the second gate off voltage; and outputting a gate voltage generated based on the clock signal and the first and second gate off voltages to a gate line of the display panel.

2. The method of claim 1, wherein the first operating mode is performed when a display apparatus having the display panel is turned on, and the second operating mode is performed when the display apparatus having the display panel is turned off.

3. The method of claim 2, wherein the second gate off voltage has a voltage value substantially the same as the gate on voltage in the second operating mode.

4. The method of claim 3, wherein the first gate off voltage is generated based on the second gate off voltage in the second operating mode.

5. The method of claim 2, wherein the clock signal alternately has voltage values of the gate on voltage and the second gate off voltage in the first operating mode.

6. The method of claim 2, wherein the clock signal has a voltage value substantially the same as the gate on voltage in the second operating mode.

7. The method of claim 1, wherein the first and second gate off voltages respectively have negative values, and the second gate off voltage is smaller than the first gate off voltage in the first operating mode.

8. A display apparatus comprising:

a display panel displaying an image;

a first voltage generating part generating a gate on voltage;

a second voltage generating part generating first and second gate off voltages based on an external voltage in a first operating mode, or based on the gate on voltage in a second operating mode;

a signal generator generating a clock signal based on the gate on voltage and the second gate off voltage; and a gate driver generating a gate voltage based on the clock signal and the first and second gate off voltages, and outputting the gate voltage to a gate line of the display panel.

9. The display apparatus of claim 8, wherein the first operating mode is performed when the display apparatus is turned on, and the second operating mode is performed when the display apparatus is turned off.

10. The display apparatus of claim 9, wherein the second voltage generating part includes:

a first gate off voltage generating part generating the first gate off voltage;

a second gate off voltage generating part generating the second gate off voltage; and a voltage sharing part outputting the second gate off voltage having a voltage level of the gate on voltage in the second operating mode.

11. The display apparatus of claim 10, wherein the first gate off voltage generating part includes a first resistor, a first diode part electrically connected to the first resistor, and a first gate off voltage output terminal electrically connected to the first diode part, and the second gate off voltage generating part includes a second diode part electrically connected to the first gate off voltage output terminal, a second resistor electrically connected to the second diode part, and a second gate off voltage output terminal electrically connected to the second resistor.

12. The display apparatus of claim 11, wherein the first gate off voltage generating part further includes a first switching element connected between the first diode part and the first gate off voltage output terminal, and the first switching element is turned off in the second operating mode.

13. The display apparatus of claim 12, wherein the first switching element includes a negative-positive-negative type bipolar junction transistor.

14. The display apparatus of claim 12, wherein the voltage sharing part includes:

a first capacitor charging the gate on voltage in the first operating mode; and a second switching element outputting the gate on voltage charged in the first capacitor to the second gate off voltage output terminal in the second operating mode.

15. The display apparatus of claim 14, further comprising a third switching element connected between the second gate off voltage output terminal and the signal generator, wherein the third switching element is turned off in the second operating mode.

16. The display apparatus of claim 9, wherein the signal generator includes a switch, and the switch includes:

a first input terminal to which the gate on voltage is applied;

a second input terminal to which the second gate off voltage is applied; and an output terminal selectively connected to the first and second input terminals.

17. The display apparatus of claim 16, wherein the output terminal is alternately connected to the first and second input terminals in the first operating mode.

18. The display apparatus of claim 16, wherein the output terminal is connected to the first input terminal in the second operating mode.

19. The display apparatus of claim 9, wherein the first and second gate off voltages respectively have negative values, and the second gate off voltage is substantially smaller than the first gate off voltage in the first operating mode.

20. The display apparatus of claim 8, wherein the gate driver is an amorphous silicon gate and is integrated on the display panel.

* * * * *